F. A. LUCKENBACH.
Process and Apparatus for Cooling and Drying Grain, &c.
No. 212,955. Patented Mar. 4, 1879.
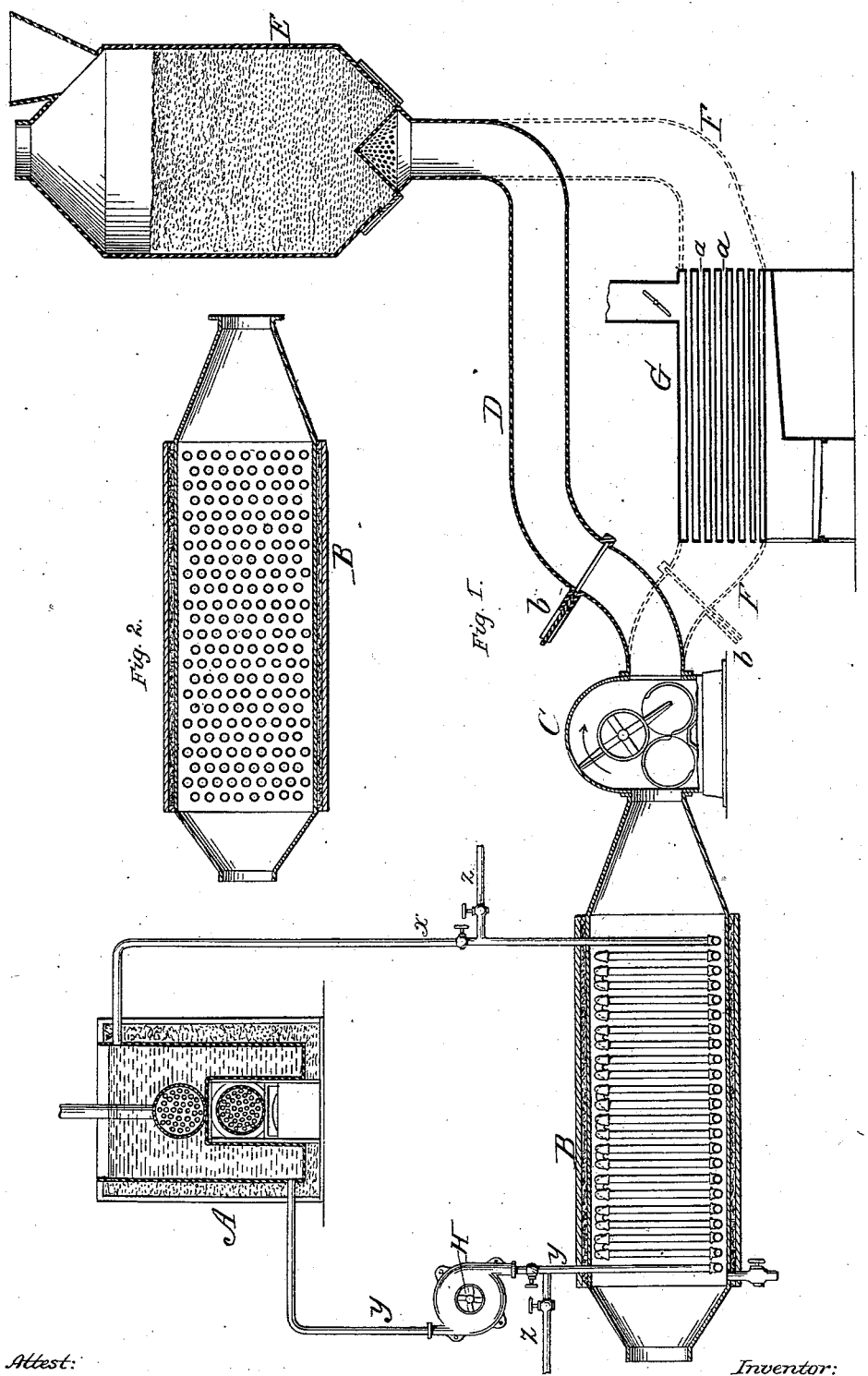

UNITED STATES PATENT OFFICE.

FREDERIC A. LUCKENBACH, OF NEW YORK, N. Y.

IMPROVEMENT IN PROCESSES AND APPARATUS FOR COOLING AND DRYING GRAIN, &c.

Specification forming part of Letters Patent No. 212,955, dated March 4, 1879; application filed December 7, 1878.

*To all whom it may concern:*

Be it known that I, FREDERIC A. LUCKENBACH, of the city, county, and State of New York, have invented an Improved Process for Cooling, Drying, and Preserving the Various Cereal Grains, likewise other perishable products, which new process is fully set forth in the following specification.

This invention relates to that class of processes employed for improving the general condition of cereal grains or other vegetable products, either for immediate use or their preservation in store or transportation.

The object of my invention is to provide an improved method or process by which the various cereal grains or other perishable substances can be more perfectly cooled, dried, and otherwise improved with greater certainty of results, with the least liability of their being damaged during the treatment, and to provide, also, an effectual and convenient apparatus for carrying out my process.

My improved process consists, essentially, in applying to the substances to be cooled and dried a current of air drawn from the surrounding atmosphere without regard to its humidity, said current being first passed over refrigerating-surfaces in finely-divided condition, whereby the moisture is speedily and effectually condensed and withdrawn, and the air rendered dry and cool by one and the same operation.

My process consists, further, in connection with the part thereof stated above, in passing the air thus dried and cooled through or over heated surfaces, so as to heat the same not over 180° Fahrenheit, and then applying the dried and warmed air to the material to be treated.

My improved apparatus consists, essentially, of a refrigerating-chamber, to which the air is directly admitted; of refrigerating-surfaces, (preferably coils of pipe for the passage of cooling liquid;) of a blower, for drawing the air into the said chamber, and for forcing it into the grain or other substance to be dried. In connection with this, and as a part thereof, it consists of a divided pipe leading from the blower to the grain or other chamber, one branch of which leads directly to the said chamber, and the other passes through pipes which are warmed by a furnace or equivalent means.

In carrying out my invention I place in proper position the best refrigerator for producing and imparting intense cold to a changing circulating current of uncongealable liquid, preferably brine of full strength. There are several kinds of refrigerators now in use suitable for this purpose.

In connection with the refrigerator I construct a series of circulating-pipes and a rotary or force pump, for circulating a cold uncongealable liquid through a great length of pipe and returning the same to the refrigerator. The series of circulating-pipes are so constructed and arranged that they will present the most circuitous and obstructed passage for the current of air drawn or forced among them, and for the diffusion of its volumes against, around, or among them, for the purpose of dividing or subdividing the volumes of air into a number of diminutive currents, and thus causing every particle of the air to be acted upon by the refrigerating-surface.

I find that the most suitable and effective form for this purpose is a series of sections of return box coils of pipe, each section being about four feet square, more or less. The sections should be connected one with another in sufficient numbers to measure when complete sixteen (16) to twenty-four (24) feet in length, forming a structure of about the dimensions indicated. The pipes of each alternate section should be placed opposite the spaces between the pipes of its front and rear sections.

The entire series, as a whole, is closely incased around the sides by a suitable covering of non-conducting material, allowing the ends to be arranged for the admission and discharge of the volumes of air drawn or forced into or from the same.

The refrigerator and the series of circulating-pipes being properly connected with each other, they are filled with the salt-brine or other suitable liquid. The pump draws the liquid from the refrigerator, and forces it through the series of circulating-pipes, returning it again to the refrigerator for a renewal of its coolness lost in its circuit.

The circulating liquid is kept many degrees below freezing-point, and in its rapid circulation through the series of pipes imparts to them its intense cold, which instantly congeals upon their surface the moisture of the air, when brought into contact therewith.

A powerful pressure-blower is placed in position between the apparatus for cooling and drying the air and the chamber holding the grain or other material to be treated, the blower drawing the volume of air through and from the cooling apparatus, and forcing it through suitable pipes into the chamber holding the grain or other material.

It is manifest from the construction of the air-refrigerating apparatus, constructed as I have described, that the air cannot pass through among the pipes within the close outer casing without coming in every part in close contact with the cold surfaces. The volumes of air, during their passage thus obstructed and rendered circuitous through the interstices between the pipes, are broken and forced against and around the surfaces of the pipes, whereby the moisture of the air is wholly condensed and deposited upon said surfaces in the form of frost or ice. The air, therefore, when discharged from the cooling apparatus, is both cold and dry, and is then in the best possible condition as a cooling and drying agent for all kinds of cereal grains, more especially for wheat when in a damp or heated condition. It will also be found well adapted for drying various other products, such as fruits, tobacco, hops, hides, &c. For such purposes it may be forced by a blower directly from the refrigerator into the mass of grain, or other material to be cooled and dried, held in suitable chambers; but if the grain or other material (especially Indian corn) should be very damp, and require a quick and powerful absorbent of its moisture, the volumes of cold air may be heated to a moderately high degree—from 150° to 160°. but not exceeding 180°, Fahrenheit—by diverting it from its direct course and allowing it to pass through either a series of heating-coils of pipes, or any other suitable arrangement for that purpose, care being taken that the temperature should not exceed the degree specified, thus rendering the dry aira powerful absorbent without causing damage to the grain by scorching. By forcing it in powerful volumes into and through the body of grain or other materials, it is capable of absorbing and carrying off contained moisture very quickly in a more perfect manner and at less expense than it has been possible to accomplish in any process heretofore employed.

After the dampness in the grain has been absorbed and carried off by the dry and warm air it may be again cooled by shutting off the warm air and admitting the cold dry air, as first described. This modification of the process may be carried on, or change made from the cold and dry air to the warm and dry air without interruption by means of the divided pipe and suitably-arranged valves.

The only interruption necessary in the operation of the process when carried on by the mechanism or apparatus thus generally described occurs when the pipes of the refrigerator are thickly covered with ice, so as to obstruct the passage of air or energy of the refrigerating-liquid. In such case I may use a steam-pipe, connected to the circulating cold pipe, with an arrangement of valves by which I can shut off the brine and turn steam through the coils of the refrigerating-chamber, or heated air may be directly forced into the chamber. An opening is provided with suitable stop-cocks for letting off the water formed by the melting of the ice accumulated in the chamber.

In the drawings hereunto attached and forming part of this specification I have shown an apparatus devised by me, and the most convenient for applying my process.

In the drawings, Figure 1 represents a longitudinal vertical section through the entire apparatus. Fig. 2 represents a horizontal section through the refrigerating-chamber, detached.

In Fig. 1, A represents a refrigerator in general form of the Pictet apparatus, though any equivalent apparatus may be substituted therefor.

The chamber in which are located the series of coils is represented at B. The arrangement of pipes by which the volume of air is finely divided and brought into contact with a large amount of refrigerating-surface is shown in the sectional view of Fig. 2. This chamber B is represented also as having a non-conducting jacket about it. Connected with the chamber B is a blower, C, by which the air is driven into and through the said chamber, and impelled through the pipe D into the grain-receptacle E.

A branch pipe F F, is represented in dotted lines, communicating with a furnace, G, or more exactly with pipes $a\ a$, around which pass the products of combustion, keeping the pipes heated and warming the air in its passage through them. Suitable valves $b\ b$ are located in the pipes D and F, near the blower, so that the current of air may be turned at pleasure through the furnace, or directly to the receptacle for grain or other material. The air by either pipe passes into said receptacle through the perforated cone at the bottom thereof, and thence through the grain or other material.

The series of coil-pipes in the chamber B are connected at one end directly to the cold-producing apparatus A by pipe $x$, and at the other end by a similar pipe, $y$, which is in connection with a rotary pump, H, in intermediate location. This pump gives circulation to the cooling-liquid. Steam-pipes $z\ z$ are connected, as shown, with the pipes $x\ y$, with suitable stop-cocks in all the pipes, so that the brine can be shut off and the steam passed through the coils in the chamber B whenever it shall be found necessary to melt the ice accumulated therein.

In the operation of the machine, the cold-producing apparatus being in action, the air, admitted through the opening on the left-hand end of the chamber B, is drawn through the coils of pipes in extremely divided currents, every part impinging against and passing over the refrigerating-surfaces of the pipes by the agency of the blower, which also forces the air, dried by its passage through the chamber B, either directly to the receptacle E or to the same through the furnace G, according to the requirement of cold or warm air.

I am aware that various perishable articles have heretofore been cooled and preserved in good condition by being placed in closed chambers, in which the air is cooled, and possibly to some extent dried, through the action of cold pipes arranged about and within the said chamber, the principal object in such cases being to secure certain low temperatures to prevent decomposition. Also, I am aware that the air of one chamber thus cooled has been made to circulate through another chamber by means of blowers, for the purpose of keeping a uniformity of low temperature in the chambers. But in such cases there are no effectual means for eliminating the moisture of the air; nor is the air drawn from the surrounding atmosphere regardless of its temperature or humidity, and first cooled and dried, and then applied to the receptacle of the materials treated.

I am aware that it is not new to cool the air to be used in ventilating granaries, and that for this purpose means have been described consisting of an air-chamber for the passage of the air, cooled by the flow of cold water circulating through a coil of pipe within said chamber.

I am also aware that it is not new in drying grain to draw the air through pipes surrounded by running water to condense its moisture, and then to heat the said air and to cause it to pass to the drier.

The essential difference between the apparatus or processes referred to and my invention is that the air which is to be used for drying the grain must be passed, according to my invention, in finely-divided currents over absolutely freezing surfaces.

I desire also to recognize as not new the combination, with a heater placed in the flue of a combustion-chamber in a position to be acted upon by the combined products of combustion, and a blower connected therewith by a pipe, adapted to force a current of air through said heater, and thence through a suitable pipe to the compartments to be heated, of a supplementary pipe leading from the blower over or around the heating apparatus and connected with the discharge-pipe of the heater, with suitable valves placed in said pipes to change the direction of the air. These matters I do not therefore claim.

Having thus described my invention, what I claim, and desire to secure by Letters Patent, is—

1. The process of cooling and drying grain and like perishable articles, consisting, first, in concentrating volumes of air drawn from the surrounding atmosphere in small currents through narrow passages over freezing-surfaces, causing the moisture of the air to congeal upon said surface, then forcing or drawing said air into and through the mass of material to be operated upon, as set forth.

2. The process of drying grain and other like perishable articles, consisting, first, in passing the air drawn from the surrounding atmosphere over freezing-surfaces in finely-divided currents, causing all the moisture therein to congeal on said freezing-surfaces, then raising the temperature of the air thus dried to a temperature of not above 180° Fahrenheit, and forcing or drawing it through the grain or other material to be treated, as set forth.

3. An apparatus for cooling and drying grain and like perishable material, consisting of a chamber closed except for ingress and egress of the air, and containing a pipe closely coiled to allow a narrow passage for the air through and among the coils and within the chambers, said coiled pipe being connected to a refrigerating apparatus capable of keeping the surface thereof at a freezing temperature, and being also connected with hot-water or steam pipes for melting the congealed moisture, the whole being in combination with a pipe or pipes for conducting the air from said chambers to the receptacle of the grain or other material and with a suitable blower, as set forth.

4. The combination, with the cooling and drying chamber, of the blower connected to said chamber, the pipe leading from said blower and having two branches provided with valves, as shown, one pipe leading directly to the receptacle for the grain or other material, and the other passing through the drying-pipes and the furnace, said apparatus being so constructed that either warm or cool dry air may be forced into the material to be dried.

In testimony whereof I have signed my name to this specification in the presence of two subscribing witnesses.

FREDERIC A. LUCKENBACH.

Witnesses:
 FRED. LUCKENBACH,
 ROGER LUCKENBACH.